United States Patent Office 3,218,670
Patented Nov. 23, 1965

3,218,670
BLOWING SPIGOT ASSEMBLY FOR BLOW
MOLDING APPARATUS
Norman Frederick Harwood, Claygate, and Alan John Osborne, Cheam, England, assignors to Baker Perkins Inc., Saginaw, Mich., a corporation of New York
Filed Apr. 4, 1963, Ser. No. 270,708
8 Claims. (Cl. 18—5)

The present invention relates to blow moulding apparatus and in particular to the construction and operation of such apparatus.

According to the invention there is provided for use in blow moulding apparatus having an extruder from which tube is engaged over blow spigot means, a blowing spigot assembly including oppositely projecting spigots mounted on a carrier which is rotatable between a position in which an upstanding spigot may accept a length of tube and then perform a blowing operation thereon, and a position in which an opposite spigot is presented for tube acceptance.

Figure 1:
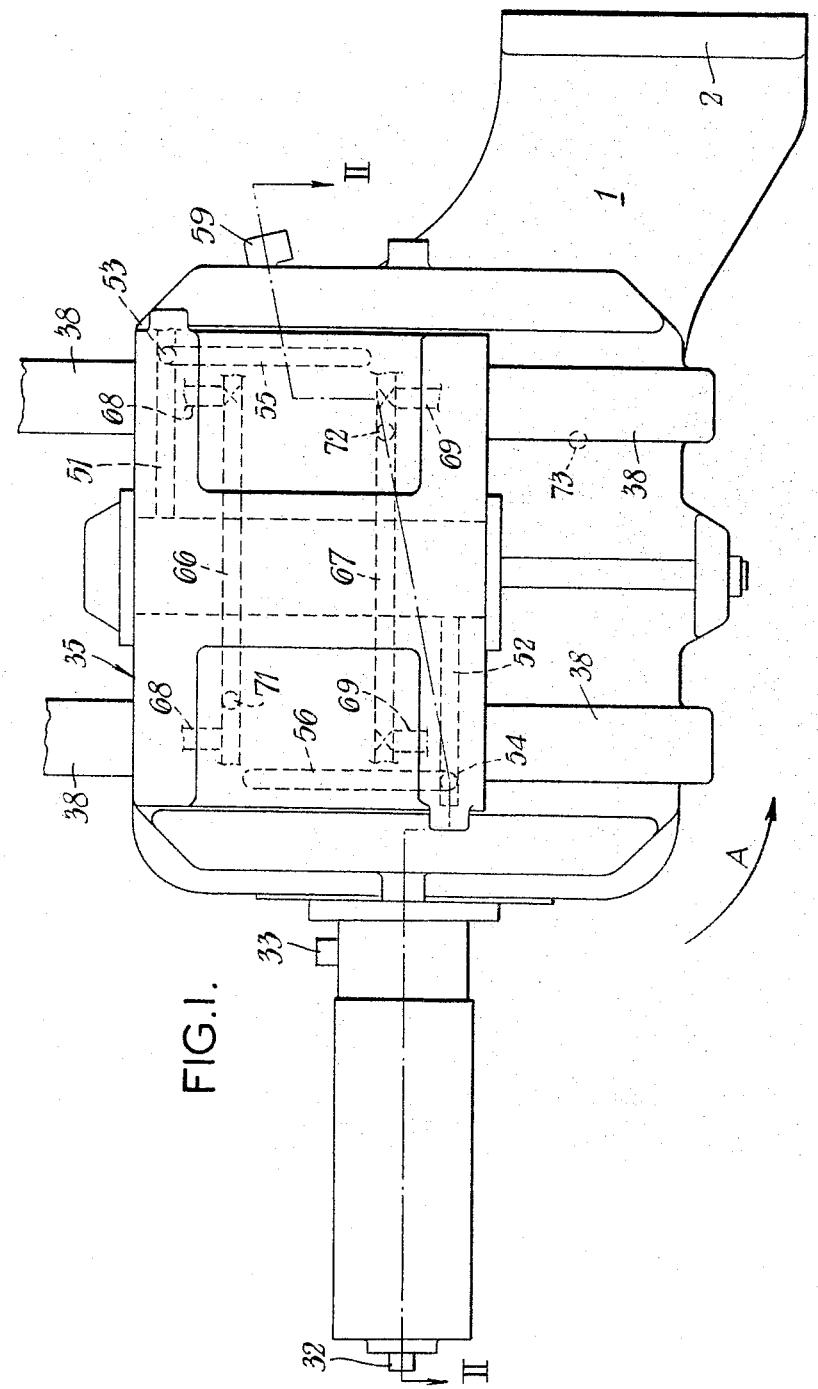
Figure 2:
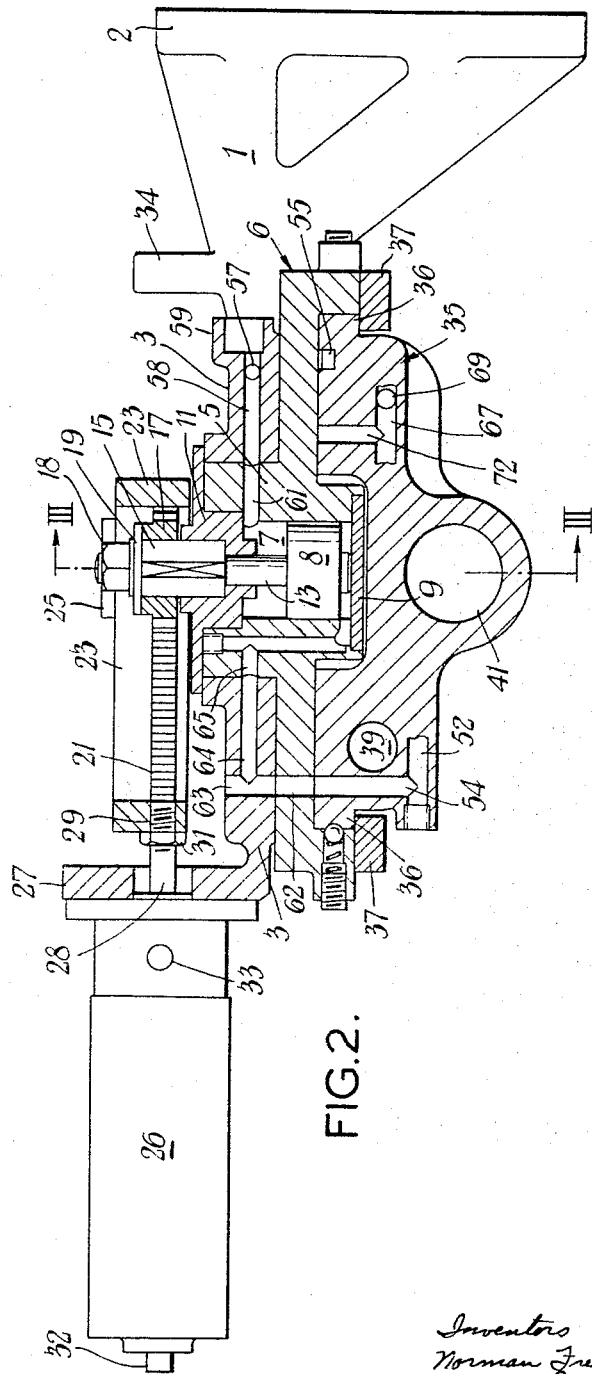
Figure 3:
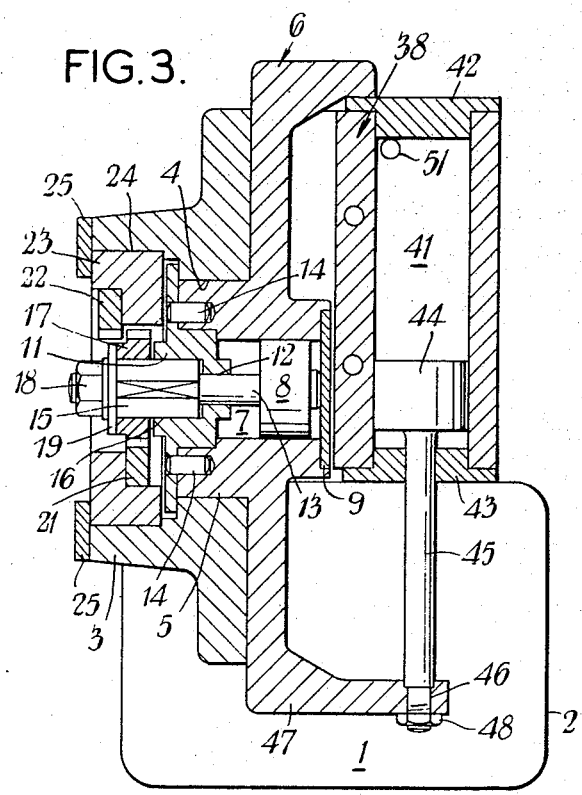

In order that the invention may be more fully understood, one construction of blowing spigot assembly in accordance with the invention, will now be described by way of example with reference to the accompanying drawings, in which FIGURE 1 shows an elevation of the spigot assembly,
FIGURE 2 shows a sectional plan taken on the line II–II in FIGURE 1, and
FIGURE 3 shows a central sectional elevation of the assembly shown in FIGURE 1, the section being taken on the line III–III in FIGURE 2.

The assembly is intended for use in blow moulding apparatus including a mould capable of receiving two lengths of extruded plastic tubing and positioned, beneath the cross-head of an extruder, on a sliding mould carriage, whereby the mould can be moved away from and towards the said position as will be described later.

Referring now to the drawings, the spigot assembly includes a bracket 1 having a base 2 which is arranged to be bolted or otherwise secured to a sliding carriage on which the mould is mounted in such a way that the assembly lies immediately below the mould. The bracket has an arm 3 which is provided with an aperture 4 to receive a boss 5 projecting from a casting 6. The casting 6 is thus rotatably mounted on the arm 3 and means, which will be described later, are provided for effecting rotation of this casting. The boss 5 is centrally bored to form a cylinder 7 which houses a pneumatically operable piston 8. One end of the cylinder 7 is closed by a plate 9 which is secured, by bolts not shown, to the casting 6 and the other end of the cylinder 7 is closed by a flanged collar 11 the flange of which is dimensioned to overlap the material of the arm 3. The collar 11 is axially bored at 12 to provide a bush for the piston rod 13 projecting from the piston 8 and is secured, by bolts not shown, to the arm 3. Rotation of the collar 11 relative to the casting 6 is additionally prevented by two diametrically opposed pegs 14 which extend through apertures in the flange of the collar 11 and into bores formed in the casting 6. The rod 13 rotatably carries a square section sleeve 15 which seats in a correspondingly shaped aperture 16 merging with the bore 12. The sleeve 15 is provided with a pinion 17 which is internally shaped to fit over the sleeve 15 and which is retained in position by a nut 18. The nut is threaded on to the free end of the piston rod 13 and bears on an interposed washer 19.

It will be seen that rotation of the pinion 17 will effect rotation of the casting 6 since the pinion is drivably connected, by the square section sleeve 15, to the flanged collar 11 which is itself drivably connected, by the pegs 14, to the casting. Furthermore, displacement of the piston 8 will effect corresponding axial displacement of the pinion 17 through such displacement will be relatively limited as can be seen by the available travel of the piston. Thus the pinion 17 can optionally engage one of two racks 21 and 22 which are inwardly facing but axially offset in relation to the pinion and which are carried on a slide 23. The slide 23 is mounted in a slideway 24 and is retained in place by parallel guides 25. The guides 25 are secured by bolts, not shown, to the arm 3. The slide 23 is arranged to be displaced by a piston and cylinder device 26 carried on a right-angled extension 27 of the arm 3 and the piston rod 28 from the device is screwed into a threaded hole 29 in the slide, the rod 28 being secured by a lock nut 31. Charging of the device 26 with compressed air effects displacement of the slide 23 and in turn the racks 21 and 22, and, for this purpose, the cylinder is provided with connections 32 and 33 arranged on both piston sides respectively. By arranging for the pinion 17 to engage the racks 21 and 22 in turn, rotation, as opposed to oscillation, of the casting can be provided for by moving the pinion 17 out of engagement with the rack 21 and into engagement with the rack 22 between forward and return strokes of the piston rod. The ratio between the pinion and the racks is chosen so that a piston stroke in either direction results in the casting 6 being angularly displaced by 180°. In order accurately to adjust the length of travel of the slide 23 so as to ensure an accurate 180° displacement of the casting 6, the bracket 1 carries a further arm 34 on which a stop, not shown, for the slide 23 is mounted.

The face of the casting 6 remote from the boss 5 is shaped slidably to receive an I-shaped spigot mounting or carrier member 35. The mounting member 35 is shaped to form two longitudinally extending keys 36 which are respectively overlapped by two parallel guides 37 bolted to the casting 6. The mounting member 35 carries four blowing spigots 38 which are arranged in oppositely facing pairs. The spigots have been omitted from FIGURE 3. Each spigot 38 which is bored to allow the passage therethrough of blowing air has a turned down end portion which is threaded for screwing into a corresponding threaded hole in the member 35. One of these holes is visible in FIGURE 2 and is referenced 39.

To reciprocate the mounting member 35 on the casting 6, the former has a pneumatic cylinder 41 integrally formed therewith, the ends of which cylinder are respectively closed by an end plate 42 and an end bush 43. The cylinder 41 houses a piston 44 which carries a piston rod 45 and this piston rod is provided with a thread at its free end for screwing into a threaded hole 46 in an arm 47 projecting from the casting 6. The rod 45 is secured by a lock nut 48. By suitably charging the cylinder 41 the position of the mounting member 35 relatively to the casting 6 can be changed from that shown in FIGURE 1 to an opposite position on the casting so that on displacement of the casting through 180°, the mounting member 35 still occupies the position shown in FIGURE 1, and vice versa.

For the purposes of charging the cylinder 41 with compressed air, the member 35 incorporates two passageways 51 and 52 leading from the cylinder at the respective ends thereof. The passages 51 and 52 communicate with cross passageways 53 and 54 respectively which in turn communicate with slots 55 and 56 formed in the rear face of the member 35 (that is the face directly in contact with the casting 6). The slot 55 communicates at or near the lower end thereof as seen in FIGURE 1, with a first pressure air cross pasageway, not shown, provided in the casting 6 which in the angular position of the casting shown, itself communicates with a second pressure air cross passageway, not shown, in communication with a vertical passageway 57 in the arm 3. As can be seen in FIGURE 2 the passageway 57 branches into a passageway 58 in the arm 3 which aligns with the bore of a union connector 59. It can also be seen from FIGURE 2 that in the angular position of the casting 6 shown, the passageway 58 communicates with a passageway 61 leading into the cylinder 7. Thus if air is fed into the assembly via the connector 59, the piston 44 will be urged downwardly in FIGURE 3 and the piston 8 will be urged away from the flanged collar 11.

Turning now to the slot 56, this communicates with a cross passageway 62 in the casting which itself, in the position of the casting shown, connects with a passageway 63 in the casting 6 which as shown in FIGURE 2 opens to atmosphere. The casting is provided with a further passageway 64 leading from the passageway 63 and communicating, in the position shown for the casting 6, with a passageway 65 which opens into the cylinder 7 at the rear of the piston 8. Thus the passageway 63 provides a common exhaust for the cylinders 41 and 7. The provision of the slots 55 and 56 provides for continuity in the supply and exhaust for the cylinder 41 notwithstanding the resulting sliding action of the mounting 35 relative to the casting 6.

For the purposes of supplying blowing air to the spigots 38, the mounting member 35 is provided with two passageways 66 and 67. The passageway 66 communicates with two further passageways 68 which communicate with the aforementioned bores in the upper spigots 38 and the passageway 67 similarly communicates via passageways 69 with the bores of the lower spigots 38. The passageway 66 also communicates with a cross passageway 71 which itself communicates with a first blowing air passageway in the casting 6, not shown, in alignment with a second blowing air passageway in the arm 3 which terminates in an external connection. Thus, in the angular position of the casting 6 shown, air can be fed into the first blowing air passageway in the casting and from thence to the upper spigots 38. The passageway 67 communicates with a cross passageway 72 which will communicate with a passageway 73 in the casting 6, when the mounting member 35 is moved into a position remote from that shown in FIGURE 1.

The operation of the assembly will now be described, on the assumption that the components of the assembly are initially in the position shown in FIGURE 1, in which the upwardly projecting spigots 38 are positioned to accept two tube lengths extruded from an overlying extruder cross head. In this position the upper spigots 38 will be positioned at the bottom of the mould between the mould halves. After the tube lengths have engaged with these spigots, the mould halves close and the extruded plastic material connecting the mould with the cross head is severed by means of cutting knives or the like. The mould then moves away from the cross head during which movement blowing of the severed tube lengths into articles takes place. This is achieved by feeding air to the external connection associated with the aforesaid first and second blowing air passageways. At the end of its outward movement, the supply of blowing air is interrupted and the mould opens and, during the ensuing movement of the mould back to its position beneath the cross head, air is admitted to the connection 32 of the cylinder 26 angularly to displace the casting 6 through 180° in the direction indicated by the arrow A which, of course, effects an inversion of the blown articles, so that at the end of return of the mould, the inverted articles lie within a flash removing and bottle stripping unit also situated beneath the extruder cross head. Such a unit will not be described herein but reference in this connection is made to applicants' copending United States applications Serial Nos. 265,194, filed March 14, 1963, and 270,707, filed April 4, 1963. The flash removing and bottle stripping unit closes around the neck of the bottles severing the excess material therefrom and additionally engage the bottom of the bottles to remove the flash material. Air is now admitted, through the connector 59 and the passageway 58, to the passageway 65 which is now in communication with the passageway 58, to displace the piston 8 so as to disengage the pinion 17 from the rack 21 and to engage the same with the rack 22. The cylinder 7 exhausts through the passageway 61, which aligns with the passageway 64 and through the passageway 63 to atmosphere. At the same time air is fed down the passageway 57, through the aforesaid pressure air passageways and the passageways 62, 54 and 52 to the cylinder 41 thus to raise the member 35 in the casting 6. The slot 56 provides for continuity of the connection between the passageways 62 and 54 whilst sliding takes place. During raising of the member 35, the cylinder 41 is exhausted through the passageway 51, the passageway 53, the aforesaid first and second pressure air passageways and the passageway 63, continuity between the passageway 53 and the first pressure air passageway being maintained by the slot 55. Raising of the mounting member 35 effects a withdrawal of the spigots 38 in question from the necks of the blown articles and a simultaneous raising of the spigots projecting from the opposite side of the mounting to receiving more plastic tubing which has meanwhile been continuously extruded. When the member 35 is fully raised, air supply to the connector 59 is interrupted.

During the next following movement of the mould away from the extruder head air is admitted through the blowing air external connection in the arm 3, which now aligns with the passageway 73 which in turn aligns with the passageway 72, to feed air to spigots in question. At the end of this outward movement, supply of blowing air is interrupted and air is admitted to the cylinder 26 through the connection 33 so as to retract the piston rod 28 which, owing to the position now adopted by the pinion 17, effects a further displacement of the casting 6 through an angle of 180°. On engagement of the articles by the flash removing and bottle stripping unit, air is again admitted through the connector 59 which is fed down the passageways 58 and 61 into the cylinder 7 to return the piston 8 to the position shown in FIGURE 2. Air simultaneously passes down the passageway 57, through the aforesaid pressure air passageways, the slot 55 and the passageways 53 and 51, to charge the cylinder 41 so as to raise the member 35. The cylinder 7 is exhausted through the passageways 65 and 64 and the cylinder 41 through the passageways 52, 54 and 62. After the member 35 has reached a fully raised position, the air supply to the connector 59 is interrupted and the components of the assembly will now have returned to their original positions shown in the drawing.

The aforesaid pneumatic cylinders are preferably controlled by microswitch controlled valves.

Whilst an I-shaped member has been described as supporting the spigots, this may suitably be replaced by a part of any desired shape provided only that the configuration of the spigots, guides, cylinder and other functional parts is maintained.

Furthermore whilst pneumatic actuation has been described, it will be appreciated that any suitable form of actuation e.g. electro-mechanical, mechanical or the like may be utilized.

We claim:

1. A blowing spigot assembly comprising a support; a carrier; means mounting said carrier on said support for rotation relative thereto; spigot supporting means; means mounting said supporting means on said carrier for rotation therewith and for reciprocating movements relative thereto; first operating means reacting between said support and said carrier for rotating the latter; second operating means reacting between said carrier and said spigot supporting means for reciprocating the latter; and spigot means carried by supporting means for movements therewith.

2. The assembly set forth in claim 1 wherein each of said operating means comprises a piston and cylinder device.

3. The assembly set forth in claim 2 wherein the cylinder of one of said second operating means is formed integrally with said spigot mounting means.

4. The assembly set forth in claim 1 wherein said first operating means includes reversible drive means operable to rotate said carrier in one direction only.

5. The assembly set forth in claim 4 wherein said reversible drive means comprises an axially movable drive shaft mounted on said carrier, a pinion mounted on said shaft, and two inwardly facing offset racks connected to said piston and cylinder device for longitudinal displacement, said racks being selectively engageable with said pinion.

6. The assembly set forth in claim 5 including an additional piston and cylinder device reacting between said carrier and said drive shaft and operable to control the axial position of said shaft.

7. The assembly set forth in claim 6 wherein the cylinder of said additional device is formed integrally with said carrier.

8. The assembly set forth in claim 1 wherein said support is provided with an aperture and wherein said carrier mounting means comprises a boss projecting from said carrier and received in said aperture.

References Cited by the Examiner
UNITED STATES PATENTS

| | | | |
|---|---|---|---|
| 2,789,312 | 4/1957 | Borer | 18—5 |
| 3,009,198 | 11/1961 | Kalman et al. | 18—5 |

WILLIAM J. STEPHENSON, *Primary Examiner.*

MICHAEL V. BRINDISI, *Examiner.*